United States Patent [19]
Ando et al.

[11] Patent Number: 5,379,990
[45] Date of Patent: Jan. 10, 1995

[54] SHOCK ABSORBER DEVICE FOR A PORTABLE ELECTRONIC APPARATUS

[75] Inventors: Nobuhiko Ando, Tokyo; Takashi Hishinuma, Kanagawa, both of Japan

[73] Assignee: Sony Corporation, Japan

[21] Appl. No.: 106,346

[22] Filed: Aug. 12, 1993

[30] Foreign Application Priority Data

Aug. 18, 1992 [JP] Japan .................................. 4-219378
Sep. 30, 1992 [JP] Japan .................................. 4-285223

[51] Int. Cl.⁶ ...................... B60G 11/58; G11B 25/04
[52] U.S. Cl. ..................... 267/34; 267/136; 369/247
[58] Field of Search ............... 369/246–248, 369/363; 267/33–35, 136; 248/619, 565, 566, 577, 619, 620, 636, 638

[56] References Cited

U.S. PATENT DOCUMENTS

| | | | |
|---|---|---|---|
| 4,731,777 | 3/1988 | Yoshitoshi et al. | 369/263 |
| 4,794,588 | 12/1988 | Yoshitoshi et al. | 369/263 |
| 4,893,210 | 1/1990 | Mintzlaff | 360/137 |
| 4,922,478 | 5/1990 | Verhagen | 369/363 |
| 4,946,129 | 8/1990 | Eastwick | 267/136 |

FOREIGN PATENT DOCUMENTS

| | | | |
|---|---|---|---|
| 230754 | 12/1963 | Austria | 267/33 |
| 0197159A1 | 10/1986 | European Pat. Off. . | |
| 0288739 | 12/1987 | Japan | 267/33 |

OTHER PUBLICATIONS

Patent Abstracts of Japan, vol. 11, No. 397 (M-655), 25 Dec. 1987 & JP-A-62 165 040 (Matsushita Electric Ind. Co. Ltd.), 21 Jul. 1987.
IBM Technical Disclosure Bulletin, vol. 33, No. 9, Feb. 1991, New York, N.Y. USA, pp. 53–57; ANON: "Frictional-elastomeric shockmount system for mechanical isolation of fragile device from sources of vibration and shock.".

Primary Examiner—Robert J. Oberleitner
Assistant Examiner—Chris Schwartz
Attorney, Agent, or Firm—Limbach & Limbach

[57] ABSTRACT

A shock absorbing device including a chassis, a frame covering the chassis, and a plurality of supporting devices for resiliently supporting one side of the chassis and the opposing other side of the chassis to the frame, wherein the supporting devices each comprise a rod, a damper formed of a resilient member and having an engagement concave portion into which the rod is fitted, and a coil spring surrounding the rod and being disposed between the chassis and the frame under compressed state, and the coil springs have spring constants of the shearing direction respectively set in response to the position of a gravity of the chassis, and disposed at one side and the other opposing side of the chassis so that the compressing directions of the coil springs are opposed to each other.

9 Claims, 6 Drawing Sheets

SHOCK ABSORBER DEVICE FOR A PORTABLE ELECTRONIC APPARATUS

BACKGROUND OF THE INVENTION

1. Field of the Invention

The present invention relates to shock absorber devices and, more particularly, is directed to a shock absorber device for use with a portable electronic apparatus or the like.

2. Description of the Prior Art

U.S. Pat. Nos. 4,731,777 and 4,794,588 describe a shock absorber mechanism utilized in a conventional mobile apparatus or the like in which a chassis is suspended from a frame by a tension coil spring.

Such shock absorber mechanism in which the chassis is suspended from the frame by the tension coil spring can achieve a shock absorbing effect when the direction in which the apparatus is disposed is determined. However, when the conventional shock absorber mechanism is utilized under the condition that the direction in which the apparatus is disposed is not yet determined, for example, when this apparatus is disposed upside down in the vertical direction, the chassis cannot be suspended by the tension coil spring. There is then the disadvantage that a predetermined shock absorbing effect cannot be achieved.

Further, there is proposed a portable optical disk player in which compression coil springs are respectively disposed above and below a chassis on which there are provided some devices such as an optical pickup device or the like.

The previously-proposed portable optical disk player in which compression coil springs are respectively disposed above and below the chassis needs at least three compression coil springs on the upper chassis portion and three compression coil springs on the lower portion, i.e., six compression coil springs in total in order to stably support the chassis. Therefore, this conventional portable optical disk player becomes complicated in arrangement.

OBJECTS AND SUMMARY OF THE INVENTION

Therefore, it is a general object of the present invention to provide an improved shock absorber device in which the aforesaid shortcomings and disadvantages encountered with the prior art can be eliminated.

More specifically, it is an object of the present invention to provide a shock absorber device of a relatively simple arrangement which can achieve equal shock absorbing effects regardless of all directions in which a portable device is placed and all directions in which a vibration is applied.

It is another object of the present invention to provide a shock absorber device in which a chassis can be stably held even when the chassis is moved within a frame by the gravity of the chassis.

It is a further object of the present invention to provide a shock absorber device which can achieve a stable shock absorbing effect and which can be miniaturized.

According to an aspect of the present invention, there is provided a shock absorbing device which comprises chassis, a frame covering the chassis, and a plurality of supporting means for resiliently supporting the entire weight of the chassis to the frame at opposing points of attachment on one side of the chassis and an opposing side of the chassis. Each supporting means comprise a rod, a damper formed of a damper body having an engagement concave portion into which the rod is fitted, and a coil spring surrounding the rod. The coil spring is disposed between the chassis and the frame under a compressed state. Each coil spring has a spring constant in the shearing direction proportional to the partial weight of the chassis at the point of attachment. The plurality of supporting means spring-bias the chassis and support the entire weight of the chassis.

BRIEF DESCRIPTION OF THE DRAWINGS

A better understanding of other objects, features, and advantages of the present invention can be gained from a consideration of the following detailed description of the preferred embodiments, in conjunction with the figures of the accompanying drawings, in which.

DETAILED DESCRIPTION OF THE PREFERRED EMBODIMENTS

A shock absorbing device of the present invention will hereinafter be described with reference to the drawings.

Figure 1:
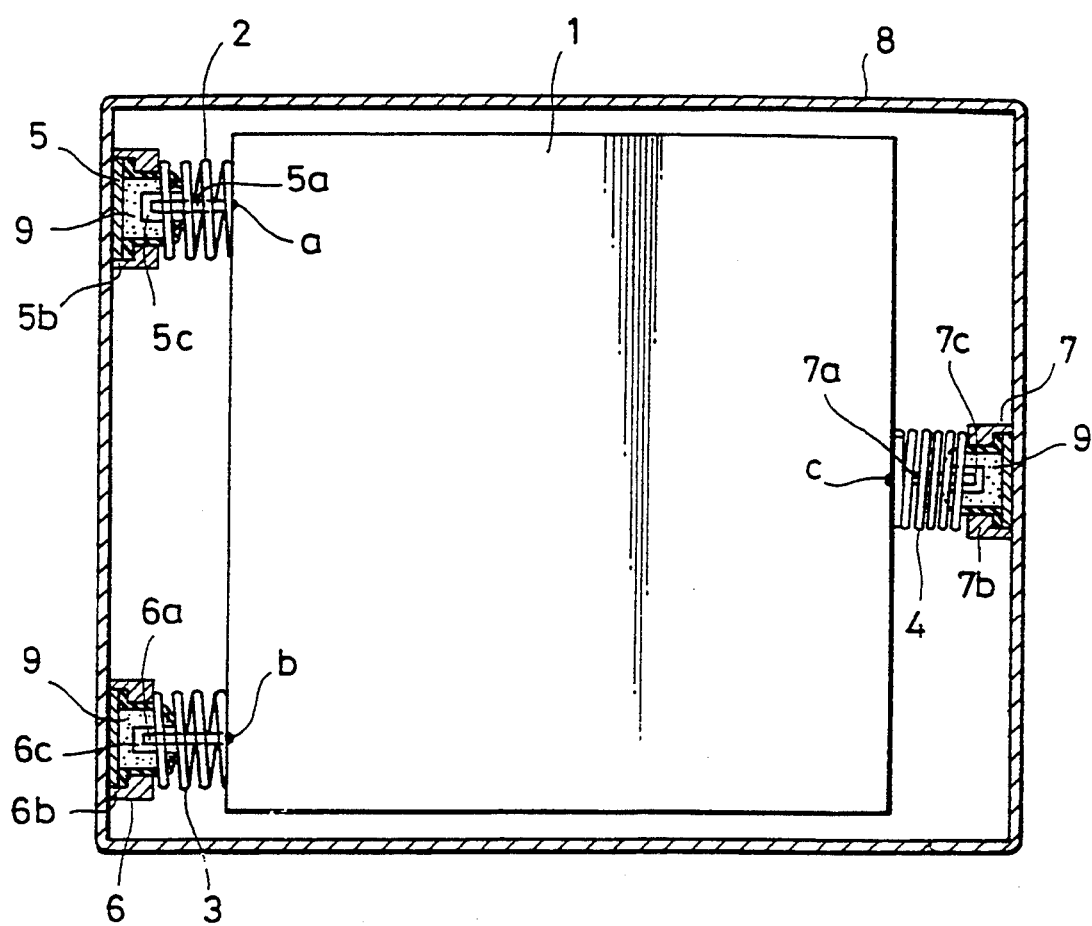
FIG. 1 is a plan view showing a shock absorbing device according to an embodiment of the present invention in a partly cross-sectional fashion.

Referring to FIG. 1 of the accompanying drawings, there is shown a chassis 1 on which some assembly parts such as an optical pickup device, a disk table or the like (not shown) are mounted. There is provided a frame 8 which constructs a housing in this embodiment. The frame 8 is formed of a flat-shaped box that covers the chassis 1.

In this embodiment, the chassis 1 is supported to the frame 8 by means of supporting portions which comprise three compression coil springs 2, 3, 4 and three dampers 5, 6, 7 made of a synthetic rubber or the like, respectively.

As shown in FIG. 1, in this embodiment, on the left-hand side of the chassis 1, two compression coil springs 2, 3 and the dampers 5, 6 serving as resilient members are disposed symmetrically with respect to the center line in the horizontal direction. On the other hand, on the central position at the right-hand side of the chassis 1, there are disposed one compression coil spring 4 and the damper 7 serving as a resilient member. The compression coil springs 2, 3 and the compression coil spring 4 are disposed so as to spring-bias the chassis 1 in the opposing direction accordingly.

The dampers 5, 6, 7 comprise rods 5a, 6a, 7a and containers 5b, 6b, 7b into each of which there is sealed a viscous fluid 9 such as a silicon oil or the like, respectively. The rods 5a, 6a, 7a are fixed to the chassis 1 and the containers 5b, 6b, 7b are fixed to the frame 8. The rods 5a, 6a, 7a are fitted into engagement concave portions 5c, 6c, 7c of the containers 5b, 6b, 7b with pressure, respectively.

The compression coil springs 2, 3 and 4 are respectively held between the containers 5b, 6b, 7b and the side walls of the chassis 1, while the rods 5a, 6a, 7a of the dampers 5, 6, 7 are used as cores thereof, respectively.

In this case, the dead weight of the chassis 1 is mainly supported by the compression coil springs 2, 3, 4 which are disposed on the left and right of the chassis 1 in an opposing relation to each other.

In this embodiment, assuming that spring constants of the compression coil springs 2, 3, 4 in the compression direction are $k\alpha 2$, $k\alpha 3$ and $k\alpha 4$ and that loads (N) that are produced by the compression of the compression coil springs 2, 3, 4 when the compression coil springs 2, 3, 4 are attached are $P_2$, $P_3$, $P_4$, then we have:

$$P_2 + P_3 = P_4 \quad (1)$$

A resonance frequency $f o\alpha$ in the spring compression direction at that time is determined by the following equation (2):

$$f o\alpha = \frac{1}{2\pi} \sqrt{\frac{k\alpha 2 + k\alpha 3 + k\alpha 4 + 3k\alpha}{M}} \quad (2)$$

where $k\alpha$ is the dynamic spring constant of the dampers 5, 6, 7 in the compression direction and M is the mass of the chassis 1.

Furthermore, in this embodiment, spring constants k2, k3 and k4 of the compression coil springs 2, 3 and 4 in the shearing direction are determined as follows. Assuming that the gravitational forces applied to attachment points a, b and c of the compression coil springs 2, 3 and 4 to the chassis 1 are respectively m2g, m3g and m4g, then we have:

$$\frac{k_2}{m2g} = \frac{k_3}{m3g} = \frac{k_4}{m4g} \quad (3)$$

At that time, the amounts that the compression coil springs 2, 3 and 4 are deformed at the attachment points a, b, and c become equal.

A resonance frequency foB of the compression coil spring in the shearing direction at that time is expressed as:

$$fo\beta = \frac{1}{2\pi} \sqrt{\frac{k2 + k3 + k4 + k\beta}{M}} \quad (4)$$

where $k\beta$ is the dynamic spring constant of the dampers 5, 6, and 7 in the shearing direction.

With the above-mentioned arrangement, when the apparatus body is placed in the horizontal direction (see FIG. 2) or when the apparatus body is placed in the lateral direction (see FIGS. 3 and 4), the chassis 1 is sunk by its own gravity applied thereto. Therefore, according to this embodiment, a clearance between the chassis 1 and the frame 8 is selected to be larger than respective sinking amounts $T_1$, $T_2$, and $T_3$.

Figure 2:
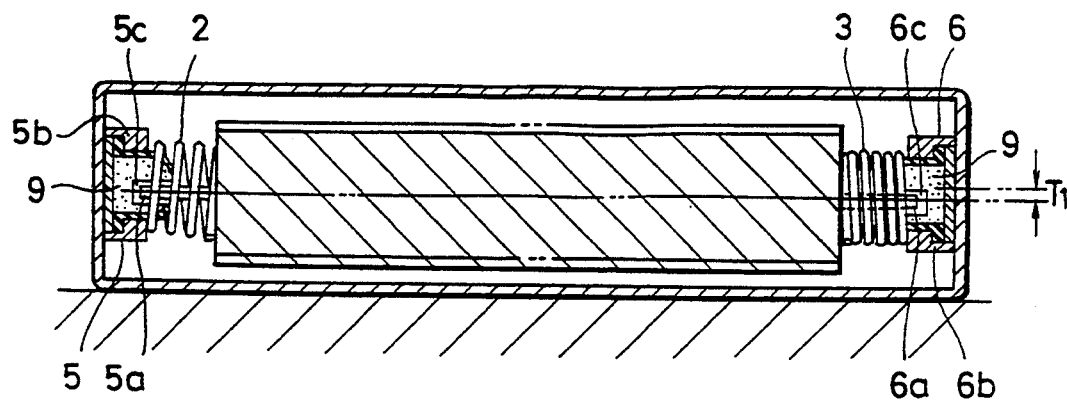
FIG. 2 is a cross-sectional view illustrating the condition that the shock absorbing device shown in FIG. 1 is placed on the horizontal plane.
Figure 3:
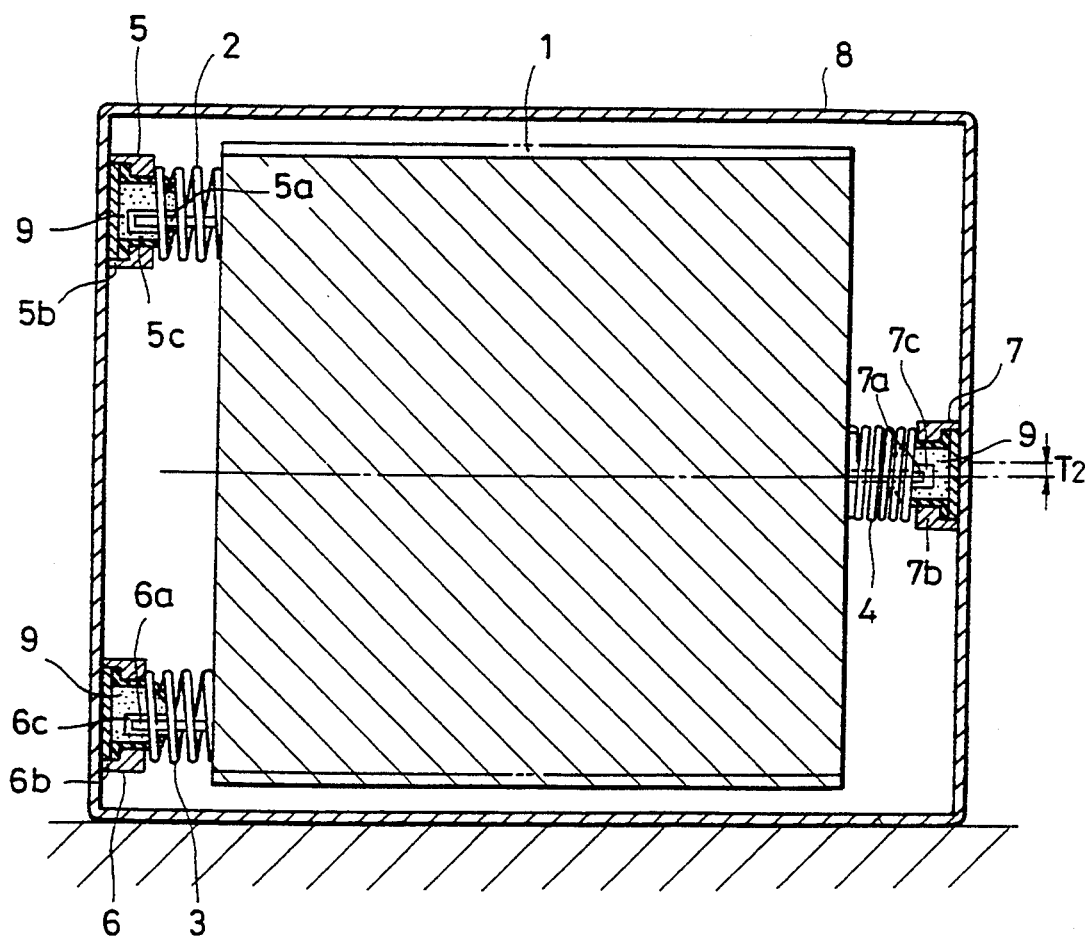
FIG. 3 is a cross-sectional view illustrating the condition that the shock absorbing device shown in FIG. 1 is placed in the lateral direction (spring-shearing direction)
Figure 4:
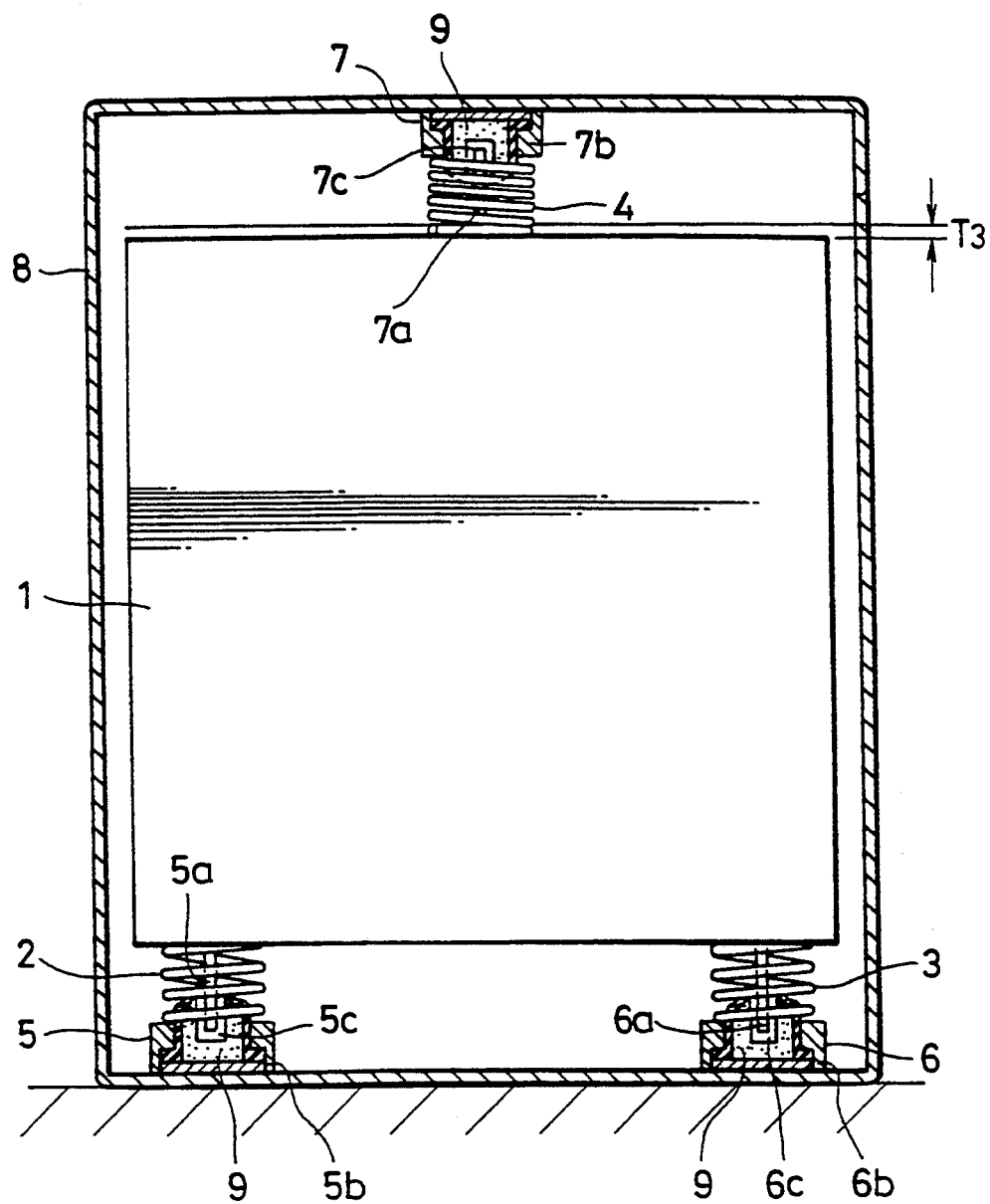
FIG. 4 is a cross-sectional view illustrating the condition that the shock absorbing device shown in FIG. 1 is placed in the lateral direction (spring-compression direction)

When the apparatus body to which the above-mentioned shock absorbing mechanism is applied is placed in any direction such as upper and lower, front and back, right and left as shown in FIGS. 2 to 4, the chassis 1 was horizontally sunk by its own gravity so that equal shock resistance characteristics could be obtained regardless of the direction in which the apparatus body is placed and vibration in any direction.

Further, if the attachment points a, b and c of the compression coil springs 2, 3 and 4 to the chassis 1 and the gravity of the chassis 1 are placed on the same plane, when the chassis 1 is placed vertically, a rotational moment is lost so that the chassis 1 is supported stably.

As an example, there can be realized a combination of compression coil springs and dampers in which transfer characteristics for all directions and all vibration directions achieve a resonance frequency of 20.4 Hz to 24.6 Hz and Q values of 5.4 dB to 6.8 dB.

Furthermore, according to this embodiment, since the chassis 1 is supported by the three compression coil springs 2, 3, 4 and the three dampers 5, 6, 7 that are disposed horizontally to one another, the number of assembly parts can be reduced and the apparatus can be simplified in arrangement.

Figure 5:
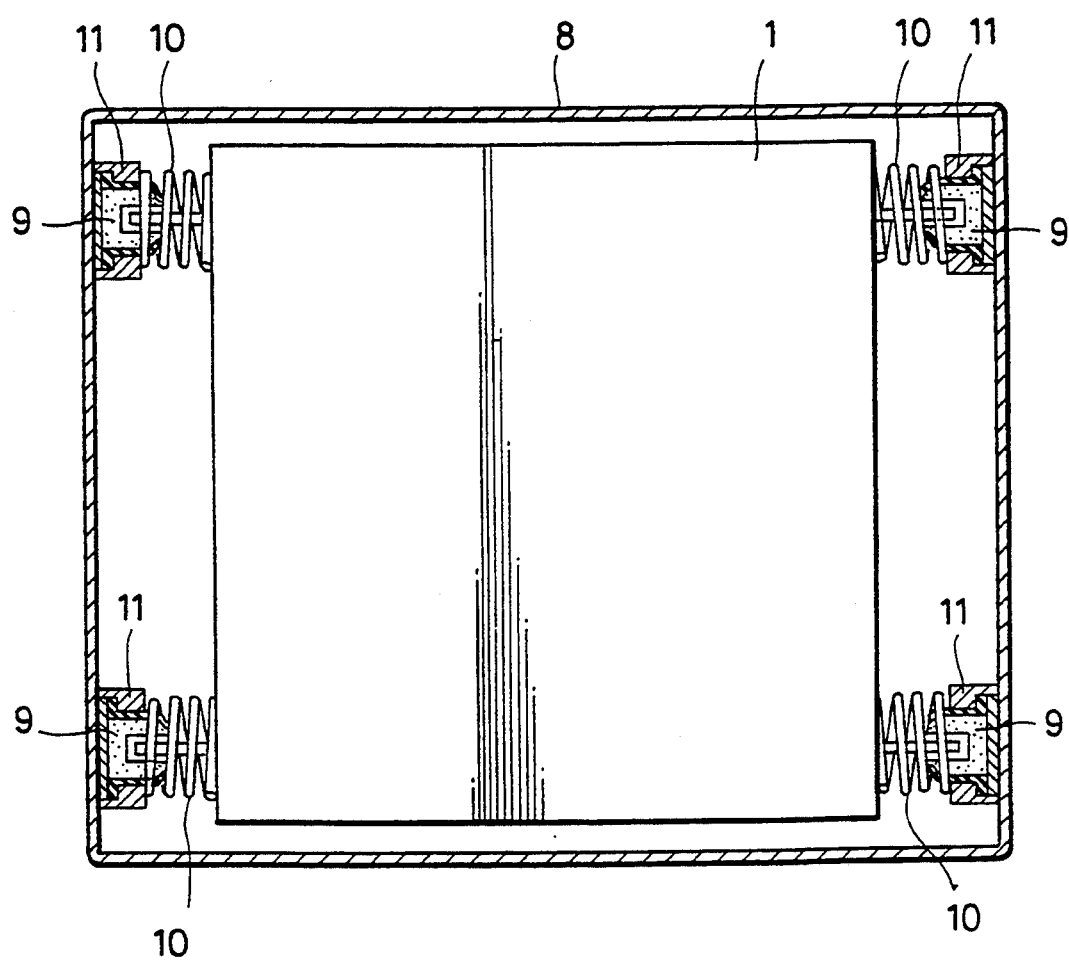
FIG. 5 is a plan view showing the shock absorbing device according to another embodiment of the present invention in a partly cross-sectional fashion.

FIG. 5 shows another embodiment of the present invention. As shown in FIG. 5, on each of the left-hand side of the chassis 1 and the opposing right-hand side thereof are symmetrically attached two compression coil springs 10 and two dampers 11 serving as resilient members with respect to the chassis 1. In this case, if the compression coil springs and the dampers are disposed so that the gravities of the attachment points of the four compression coil springs 10 and the gravity of the chassis 1 become coincident with each other, there is then the advantage such that the four same compression coil springs 10 can be utilized. Also, it can be easily understood that similar action and effects to those of the first embodiment shown in FIG. 1 can be achieved.

Figure 6:
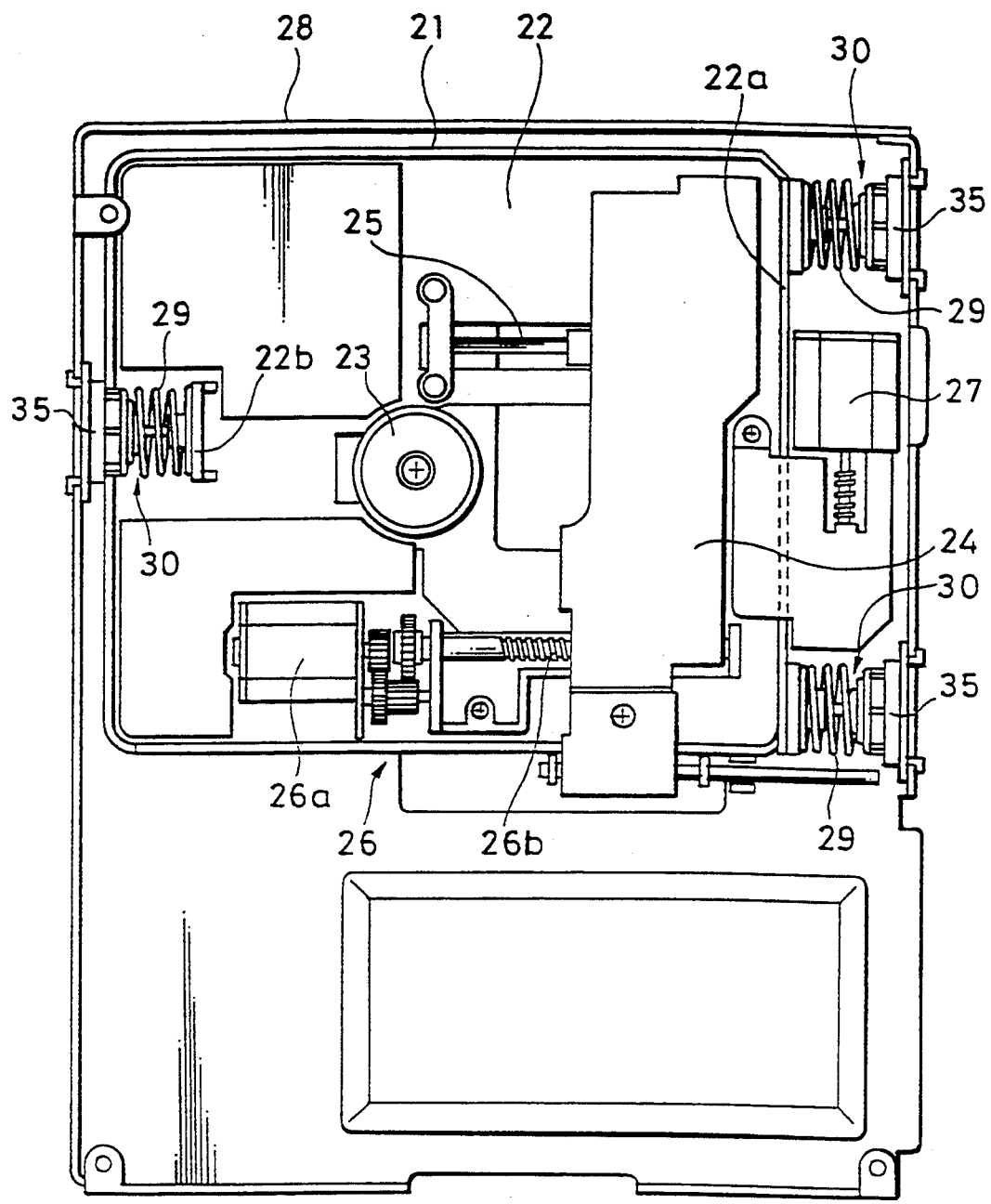
FIG. 6 is a bottom view showing a disk driving apparatus to which the shock absorbing device of the present invention is applied in actual practice.

FIG. 6 shows a portable optical disk driving apparatus as a practical example of electronic apparatus having the shock absorbing mechanism. FIG. 6 is a bottom view showing the inside of the portable optical disk driving apparatus from the rear side (bottom side).

As shown in FIG. 6, there is provided a mechanism unit 21. The mechanism unit 21 includes a chassis 22 on which there are mounted a disk loading mechanism, a disk rotation drive mechanism, a mechanism assembly parts forming a disk recording and reproducing mechanism or the like. A motor 23 is adapted to rotate a disk (not shown) and an optical head attachment mount 24 is adapted to mount thereon an optical head device from which a laser light is radiated on the disk so that a signal is recorded on and/or reproduced from the disk. A guide shaft 25 is adapted to support the optical head attachment mount 24 such that the optical head attachment mount 24 can be moved in the diametrical direction of the disk. A translating mechanism 26 is comprised of a motor 26a and a screw shaft 26b rotated by the motor 26a and screwed into the optical head attachment mount 24, thereby translating the optical head attachment mount 24. A motor 27 is adapted to drive the disk loading mechanism.

A sub chassis (frame) 28 is shaped in box to construct an outer housing. The above-mentioned mechanism unit 21 is supported to the sub chassis 28 via two pairs of compression coil springs 29 and two damping mechanisms 30 provided on one side of the sub chassis 28 and one pair of compression coil spring 29 and one damping mechanism 30 on the other side of sub chassis 28.

Figure 7:
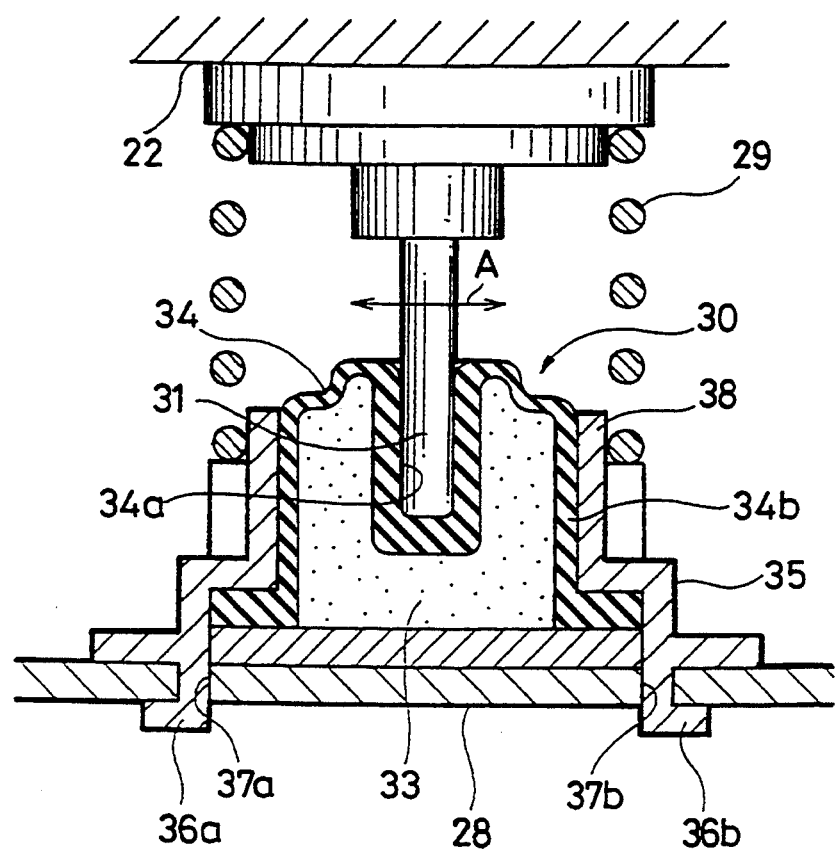
FIG. 7 is a schematic diagram showing a supporting portion formed of a compression coil spring and a damper mechanism in an enlarged scale.

FIG. 7 shows more in detail a structure of the supporting portions each being formed of the compression coil spring 29 and the damping mechanism 30.

As shown in FIG. 7, the damping mechanism 30 comprises a rod 31 and a damper body 34 made of a resilient member such as a synthetic rubber or the like into which there is sealed a viscous fluid 33 such as a silicon oil or the like. The rod 31 is projected from a side portion of the chassis 22 of the mechanism unit 21 (one side is a side plate portion 22a formed by bending the end portion of the chassis 22 and the other side is a leg piece portion 22b vertically erected on the chassis 22 as shown in FIG. 6). On the other hand, the damping body 34 is fixed to the inner surface of the side portion of the sub chassis 28 through a fixed mount 35, and the top of the rod 31 is fitted into an engagement concave portion 34a formed at the central portion of the damper body 34.

The fixed mount 35 is attached to the sub chassis 28 by engaging a pair of hook-shaped fixed leg portions 36a, 36b protruded from the fixed mount 35 into groove portions 37a, 37b of the sub chassis 28, respectively.

On the fixed mount 35 is formed a wall portion 38 that surrounds the damper body 34. The wall portion 38 is elongated to the height sufficient that it covers substantially the whole surface of a peripheral wall portion 34b of the damper body 34 and that it opposes the top portion of the rod 31. The top portion of the rod 31 is fitted into the inside of the wall portion 38. Thus, the wall portion 38 can prevent the damper body 34 from being buckled by the vibration in the lateral direction as will be described later on.

On the other hand, the compression coil spring 29 is located to surround the rod 31 so as to hold therein the rod 31 as the core and interposed between the chassis 22 and the fixed mount 35 of the sub chassis 28 in a compressed fashion. A vibration transmitted from the outer sub chassis 28 to the mechanism unit 21 through the chassis 22 can be damped by the spring force of the compression coil spring 29.

When a vibration in the lateral direction, i.e., in the direction in which the damper body 34 is sheared is applied to the damper mechanism 30, the viscous fluid (oil) 33 within the damper body 34 is flowed in accordance with the movement of the rod 31 (in the direction shown by an arrow A in FIG. 7), thereby achieving a predetermined damping effect.

At that time, the wall portion 38 formed on the fixed mount 35 can prevent the damper body 34 from being buckled, thereby achieving a reliable damping effect. That is to say, if there is not provided the wall portion 38, if a vibration in the lateral direction is applied to a small damper which is applied to the portable disk driving apparatus of this embodiment, then when the rod 31 is moved in the arrow A direction, the peripheral wall portion 34b of the damper body 34 is moved, deformed and buckled together therewith as compared with the movement of the viscous fluid 33, thereby deteriorating the damping effect. However, since the damper body 34 is prevented from being buckled by the provision of wall portion 38, even the small damper can achieve the reliable damping effect.

Further, since the wall portion 38 is provided as an assembly part independent of the damper body 34, the value of the resonance frequency $f_0$ of the damper can be prevented from being increased and a satisfactory damping characteristic can be maintained.

Furthermore, the rod 31, for example, is projected from the inner surface side of the side portion of the sub chassis 28 and the damper body 34 is fixed to the side portion of the chassis 22 with effects similar to those of the aforesaid embodiments being achieved.

It is needless to say that the present invention is not limited to the shock absorbing device of the portable disk driving apparatus and may be applied to a variety of shock absorbing devices of various electronic apparatus.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A shock absorbing device comprising:
   (a) chassis;
   (b) a frame covering said chassis; and
   (c) a plurality of supporting means for resiliently supporting the entire weight of said chassis from said frame at opposing points of attachment on one side of said chassis and an opposing side of said chassis, wherein said supporting means each comprise a rod, a damper formed of a damper body having an engagement concave portion into which said rod is fitted, and a coil spring surrounding said rod and being disposed between said chassis and said frame under a compressed state; wherein each coil spring has a spring constant in the shearing direction proportional to the partial weight of said chassis at said point of attachment; and said plurality of supporting means spring-bias said chassis.

2. The shock absorbing device according to claim 1, wherein each damper body further comprises a container within which a viscous fluid is sealed and each of said coil springs is held between said container and said chassis so as to hold said rod as a shaft.

3. The shock absorbing device according to claim 2, wherein said coil springs are respectively attached between said chassis and said frame such that a total load applied to one of the coil springs disposed on one side of said chassis substantially equals a total load applied to another of the coil springs disposed on another side of said chassis.

4. The shock absorbing device according to claim 3, wherein the opposing points of attachment on said chassis are in a plane which passes through the center of gravity of said chassis.

5. The shock absorbing device according to claim 1, wherein said damper body is formed of a resilient member and further comprises a container within which a viscous fluid is sealed, said damper body being fixed to said frame through a mount.

6. The shock absorbing device according to claim 5, wherein said rod is attached to said chassis.

7. The shock absorbing device according to claim 5, wherein said mount includes a pair of leg portions and is attached to said frame by engaging the pair of leg portions into groove portions formed through said frame.

8. The shock absorbing device according to claim 5, wherein said mount includes a wall portion covering a peripheral wall portion of said damper body and said wall portion is mounted on said mount to have a height sufficient that said rod is fitted into said engagement concave portion of said damper.

9. The shock absorbing device according to claim 1, wherein said chassis has a disk driving mechanism mounted thereon.

* * * * *